US011783091B2

(12) United States Patent
Ibrahim et al.

(10) Patent No.: US 11,783,091 B2
(45) Date of Patent: Oct. 10, 2023

(54) EXECUTING ENTITY-SPECIFIC CRYPTOGRAPHIC CODE IN A CRYPTOGRAPHIC COPROCESSOR

(71) Applicant: American Express Travel Related Services Company, Inc., New York, NY (US)

(72) Inventors: Wael Ibrahim, San Diego, CA (US); Manish K. Deliwala, Chandler, AZ (US); Manik Biswas, Burgess Hill (GB); Subrahmanyam Venakata Vishnuvajhala, Phoenix, AZ (US); Andrew Lei, Brooklyn, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 17/749,998

(22) Filed: May 20, 2022

(65) Prior Publication Data

US 2022/0284133 A1 Sep. 8, 2022

Related U.S. Application Data

(63) Continuation of application No. 16/668,973, filed on Oct. 30, 2019, now Pat. No. 11,341,280.

(60) Provisional application No. 62/914,275, filed on Oct. 11, 2019.

(51) Int. Cl.
*G06F 21/72* (2013.01)
*G06F 21/60* (2013.01)
*H04L 9/32* (2006.01)

(52) U.S. Cl.
CPC ........... *G06F 21/72* (2013.01); *G06F 21/602* (2013.01); *H04L 9/3234* (2013.01)

(58) Field of Classification Search
CPC ....... G06F 21/72; G06F 21/602; H04L 9/3234
See application file for complete search history.

(56) References Cited

U.S. PATENT DOCUMENTS

| | | | |
|---|---|---|---|
| 7,657,033 B2 | 2/2010 | Fiske | |
| 8,010,802 B2 | 8/2011 | Kang et al. | |
| 8,756,417 B1 | 6/2014 | Gardner | |
| 10,735,190 B1 | 8/2020 | Khare | |
| 2007/0205258 A1 | 9/2007 | Self et al. | |
| 2013/0118555 A1 | 5/2013 | Samuels | |

(Continued)

FOREIGN PATENT DOCUMENTS

| | | |
|---|---|---|
| EP | 1834438 | 3/2016 |
| JP | 2001125481 A | 5/2001 |

(Continued)

*Primary Examiner* — Ayoub Alata
(74) *Attorney, Agent, or Firm* — Thomas | Horstemeyer, LLP

(57) ABSTRACT

Disclosed are various embodiments for executing entity-specific cryptographic code in a cryptographic coprocessor. In one embodiment, an exemplary method comprises receiving encrypted code that includes implementing a cryptographic algorithm from a service via a network, wherein the encrypted code further includes a symmetric encryption key; decrypting, by a cryptographic coprocessor, the encrypted code; executing, by the cryptographic coprocessor, the decrypted code to generate a cryptogram including information encrypted using the cryptographic algorithm and the symmetric encryption key; and sending the cryptogram to the service via the network.

19 Claims, 7 Drawing Sheets

(56) References Cited

U.S. PATENT DOCUMENTS

| | | |
|---|---|---|
| 2016/0352509 A1 | 12/2016 | Wu et al. |
| 2016/0381010 A1 | 12/2016 | Bhandari et al. |
| 2017/0010875 A1 | 1/2017 | Martinez |
| 2017/0250803 A1 | 8/2017 | Zhang et al. |
| 2017/0270528 A1 | 9/2017 | Prakash et al. |

FOREIGN PATENT DOCUMENTS

| | | |
|---|---|---|
| JP | 2001338271 A | 12/2001 |
| JP | 2004519050 A | 6/2004 |
| KR | 1020090059602 | 6/2009 |

EXECUTING ENTITY-SPECIFIC CRYPTOGRAPHIC CODE IN A CRYPTOGRAPHIC COPROCESSOR

CROSS-REFERENCE TO RELATED APPLICATIONS

This application is a continuation of co-pending U.S. utility application entitled, "EXECUTING ENTITY-SPECIFIC CRYPTOGRAPHIC CODE IN A CRYPTOGRAPHIC COPROCESSOR," having Ser. No. 16/668,973, filed Oct. 30, 2019, which claims priority to, and the benefit of, U.S. Provisional Patent Application entitled "EXECUTING ENTITY-SPECIFIC CRYPTOGRAPHIC CODE IN A CRYPTOGRAPHIC COPROCESSOR," filed on Oct. 11, 2019, and assigned application No. 62/914,275, which are both incorporated herein by reference in their entirety.

BACKGROUND

A diverse variety of cryptographic algorithms are available. Some cryptographic algorithms are symmetric, meaning that the same key is used both to encrypt plaintext and to decrypt ciphertext. Other cryptographic algorithms are asymmetric, meaning that different related keys are used to encrypt plaintext (e.g., a public key) and to decrypt ciphertext (e.g., a private key). As computing power advances, some cryptographic algorithms that were once thought to be secure are now considered insecure. For example, the Data Encryption Standard (DES), with a 56-bit key length, was once thought to be secure. However, it is now easily broken with brute-force attacks. Further, backdoors and/or other weaknesses may be discovered in cryptographic algorithms that render them insecure without fully brute-forcing all key combinations.

Financial institutions, payment issuers, and other organizations that handle high value data may each arrive at their own decisions as to which cryptographic algorithm is preferred. Also, their respective preferred cryptographic algorithms may change over time in view of newly disclosed vulnerabilities. Moreover, there may be security value in not disclosing which cryptographic algorithm is used.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
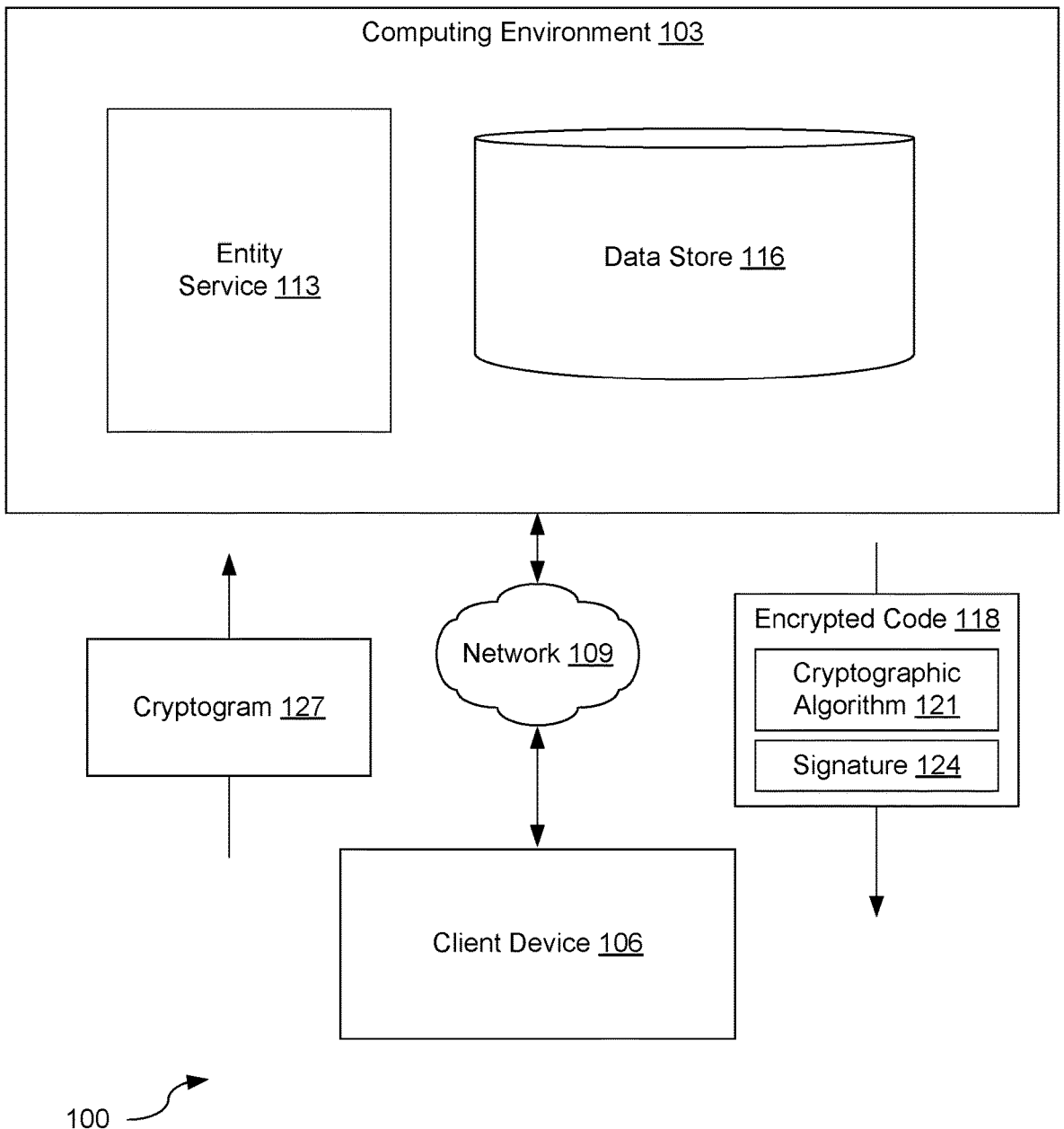
FIG. 1 is a drawing of a network environment according to various embodiments of the present disclosure.

The present disclosure relates to the use of entity-selected cryptographic algorithms on client devices in communication with a service associated with the entity. For example, an entity such as a financial institution, a payment processor, a merchant gateway, a payment issuer, or other entity may desire that specific information sent to it be encrypted using a particular cryptographic algorithm. Also, the entity may use the particular cryptographic algorithm in communicating information to client devices. The entity may desire to keep the identity of the particular cryptographic algorithm secret to improve security. Further, the entity may decide, in its own discretion, to update or change the particular cryptographic algorithm from time to time.

In a first set of embodiments, a cryptographic coprocessor such as a trusted platform module (TPM) on a client device may be configured to support crypto-agility, or the ability to use different cryptographic algorithms. For example, a cryptographic coprocessor may support a predefined set of cryptographic algorithms, where the algorithms that are included in the set are selected by a manufacturer of the device hardware, a standards body, an operating system developer. The cryptographic algorithms may be permanently included in a hardware cryptographic coprocessor or capable of being updated in a firmware or software cryptographic coprocessor.

Rather than using cryptographic algorithms in the predefined set, an entity may prefer to use a different cryptographic algorithm. For example, the algorithm preferred by the entity may be released after the cryptographic coprocessor was created. Accordingly, the cryptographic coprocessor would not have embedded support for the algorithm and would have to provision for its use in crypto-agility.

As will be described, in various embodiments, an entity may send code implementing a cryptographic algorithm to a client device having a cryptographic coprocessor with crypto-agility. The code implementing the cryptographic algorithm may be itself encrypted, thereby shielding the identity of the algorithm and/or its inner workings. The code implementing the cryptographic algorithm may then be decrypted within the cryptographic coprocessor using a key associated with the entity. The cryptographic coprocessor can then execute the code within the cryptographic coprocessor to encrypt information to be sent to the entity or to decrypt information sent from the entity. In this way, applications executing on the client device do not have access to the cryptographic algorithm, and the code implementing the cryptographic algorithm is executed in a secure way.

In a second set of embodiments, a client device has a separate trusted execution environment in addition to a cryptographic coprocessor. For example, ARM-based devices may include security extensions that support TRUSTZONE functionality, INTEL-based devices may have TRUSTED EXECUTION TECHNOLOGY and SGX SOFTWARE GUARD EXTENSIONS, and AMD-based devices may have a PLATFORM SECURITY PROCESSOR and the AMD SECURE EXECUTION ENVIRON- MENT. This provides a separate virtual processor that executes a secure operating system with hardware-based access control. Signed third-party applications can be executed within the trusted execution environment. As will be described, in various embodiments, an entity may create a trusted application for execution in the trusted execution environment that is configured to receive code implementing a cryptographic algorithm, where the code is itself encrypted. A cryptographic coprocessor may be used to verify the authenticity and integrity of the code, after which the trusted application may then decrypt the code implementing the cryptographic algorithm and execute the code to encrypt information to be sent to the entity or to decrypt information sent from the entity.

In the following discussion, a general description of the system and its components is provided, followed by a discussion of the operation of the same.

With reference to FIG. 1, shown is a network environment 100 according to various embodiments. The network environment 100 includes a computing environment 103 and a client device 106, which are in data communication with each other via a network 109. The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 may be operated for or on behalf of an entity such as a financial institution, a payment processor, a payment gateway, a payment issuer, or another entity. The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include an entity service 113 and other applications, services, processes, systems, engines, or functionality not discussed in detail herein. The entity service 113 may be operated by or on behalf of the entity to perform functions such as authentication, payment authorization, payment processing, or other functions. Although one entity service 113 is described for purposes of discussion, it is understood that multiple services may be implemented to perform portions of these functions.

Also, various data is stored in a data store 116 that is accessible to the computing environment 103. The data store 116 can be representative of a plurality of data stores 116, which can include relational databases, non-relational databases, object-oriented databases, hierarchical databases, hash tables or similar key-value data stores, as well as other data storage applications or data structures. The data stored in the data store 116 is associated with the operation of the various applications hosted by the computing environment 103.

The client device 106 is representative of one or more client devices 106 that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

Next, a general description of the operation of the various components of the network environment 100 is provided. Although the following description provides one example of the operation of and interaction between the various components of the network environment 100, other operations or interactions may also occur, as discussed later in the accompanying description of subsequent figures.

To begin, the entity service 113 sends encrypted code 118 to the client device 106 via the network 109. The encrypted code 118 includes a cryptographic algorithm 121 and a signature 124. The cryptographic algorithm 121 may correspond to a symmetric algorithm, an asymmetric algorithm, or a hybrid algorithm that is a combination of both. Non-limiting examples of the cryptographic algorithm 121 may include the Triple Data Encryption Algorithm (Triple DES), the Advanced Encryption Standard (AES), ChaCha, Salsa 20, Twofish, and so on.

In some cases, the cryptographic algorithm 121 may include a key for use with the cryptographic algorithm 121 in order to decrypt and/or encrypt data with the cryptographic algorithm 121. Alternatively, such key(s) may be otherwise available to the client device 106. The encrypted code 118 includes a signature 124 that may be used to verify the authenticity or integrity of the encrypted code 118.

After receiving the encrypted code 118, using one or more keys available to the client device 106, the client device 106 verifies the signature 124 of the encrypted code 118 and then decrypts the encrypted code 118. The client device 106 can then use the cryptographic algorithm 121 along with a key to perform a cryptographic operation such as generating a cryptogram 127. The cryptogram 127 may correspond to a payment transaction and may include data such as a device primary account number, a transaction amount, a limited-use payment credential or a limited-use key, an unpredictable number, a timestamp, a transaction counter, and/or other information that may be used to authorize a payment transaction. The cryptogram 127 is then sent over the network 109 to the entity service 113.

Figure 2A:
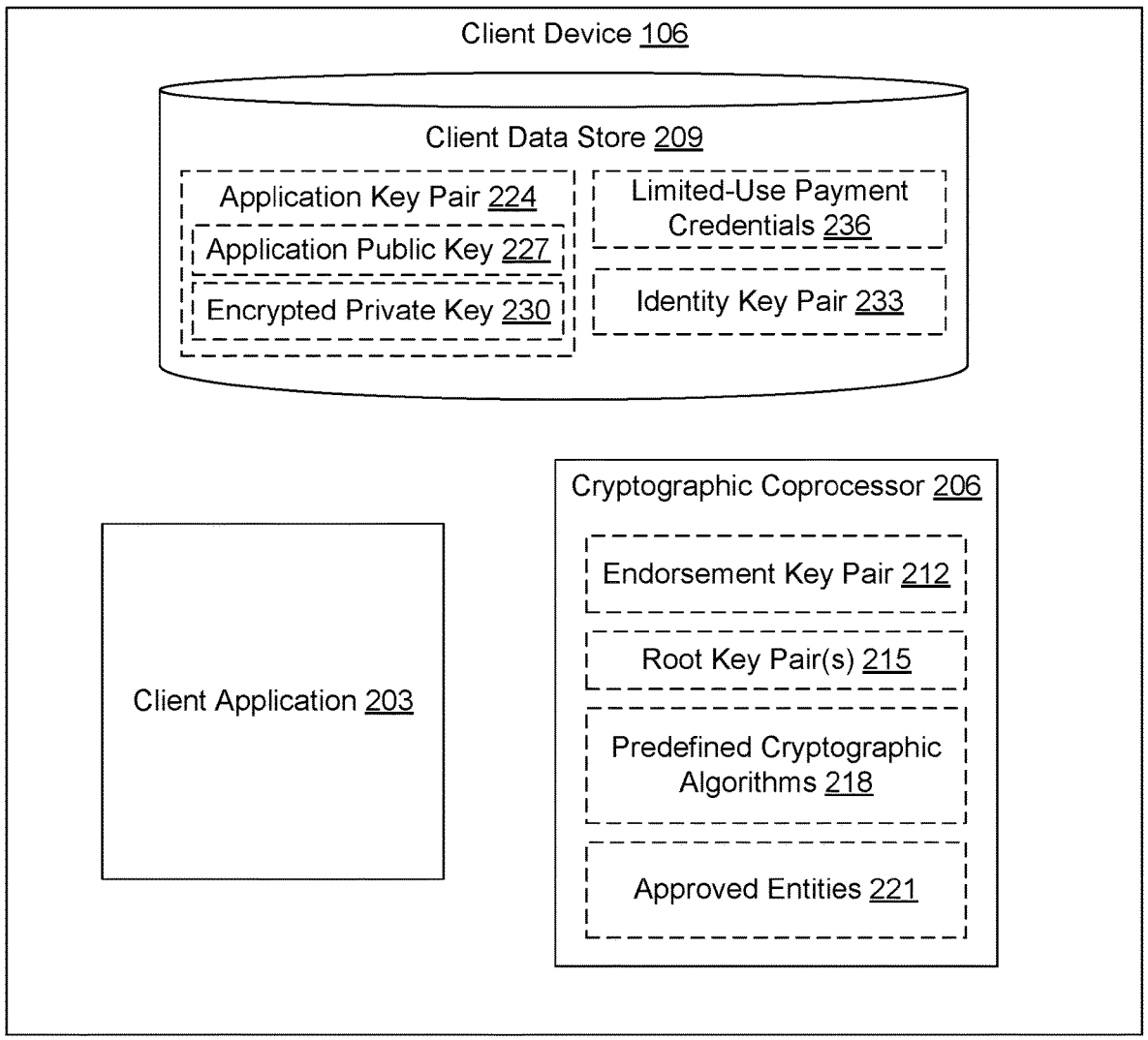
FIG. 2A is a drawing of a client device of the network environment of FIG. 1 according to various embodiments.

Turning now to FIG. 2A, shown is an example of a client device 106 according to various embodiments. The client device 106 can execute a client application 203 and other applications. The client device 106 may include a cryptographic coprocessor 206, a client data store 209, and other components.

The client application 203 may be associated with the entity and may be used to perform functions with respect to the entity. For example, the client application 203 may be executed to initiate or manage payment transactions through the entity service 113 (FIG. 1) using a payment instrument. In this regard, the client application 203 may receive the encrypted code 118 (FIG. 1) from the entity service 113, cause a cryptogram 127 (FIG. 1) to be generated via the cryptographic coprocessor 206, and then send the cryptogram 127 including encrypted information to the entity service 113. In addition, the client application 203 may receive encrypted data from the entity service 113, cause the encrypted data to be decrypted using the encrypted code 118 via the cryptographic coprocessor 206, and then process the decrypted data.

The cryptographic coprocessor 206 can represent a physical or emulated dedicated microcontroller that secures hardware using integrated cryptographic keys and provides various cryptographic operations. The cryptographic coprocessor 206 may implement a version of the TPM standard from the Trusted Computing Group (TCG). Although the cryptographic coprocessor 206 may be implemented in hardware to prevent tampering with or circumvention of the cryptographic coprocessor 206, the functionality of the cryptographic coprocessor 206 can be implemented in firmware or software on those client devices 106 that lack a hardware-based cryptographic coprocessor 206.

The cryptographic coprocessor 206 can perform various cryptographic functions or operations on behalf of the client device 106 or applications executed by the client device 106. For example, the cryptographic coprocessor 206 may generate random numbers using a pseudorandom number generator (PRNG) or random number generator (RNG) included in the cryptographic coprocessor 206. As another example, the cryptographic coprocessor 206 can securely generate cryptographic keys or key-pairs, including symmetric encryption keys and asymmetric encryption key-pairs. The cryptographic coprocessor 206 can also encrypt or decrypt data using a cryptographic key generated by or imported into the cryptographic coprocessor 206. As another example, the cryptographic coprocessor 206 can also generate a hash of the current state of the hardware and software configuration of the client device 106, which can allow for remote attestation of the identity of the client device 106 or user of the client device 106.

To perform these operations, various cryptographic keys can be stored within the cryptographic coprocessor 206. These can include an endorsement key-pair 212 and one or more root key-pairs 215, such as storage root keys. The endorsement key-pair 212 and the root key-pair(s) 215 may be stored within the cryptographic coprocessor 206 itself in order to protect the keys from compromise.

The endorsement key-pair 212 is an asymmetric encryption key-pair that includes a public and private encryption key that are unique to the cryptographic coprocessor 206. The endorsement key-pair 212 can be used by the cryptographic coprocessor 206 to verify or assert its identity, and therefore the identity of the client device 106 or user of the client device 106, to other parties or devices. Should the endorsement key-pair 212 be disclosed to a third party, the third party could potentially forge the identity of the cryptographic coprocessor 206. Therefore, the endorsement key-pair 212 is generally used to sign other encryption keys, which may then be used to assert or verify the identity of the cryptographic coprocessor 206. To preserve the integrity of the endorsement key-pair 212 and ensure that the endorsement key-pair 212 is unique with respect to other endorsement key-pairs 212 installed on other cryptographic coprocessors 206, the endorsement key-pair 212 can be provisioned and stored on the cryptographic coprocessor 206 at the factory.

The root key-pair(s) 215 can be asymmetric encryption key-pairs that can be used by the cryptographic coprocessor 206 to encrypt and/or sign data. The root key-pair 215 can be replaced if required, although any data encrypted with the root key-pair 215 will be unrecoverable if the root key-pair 215 is replaced with a new root key-pair 215. In some implementations, the cryptographic coprocessor 206 can support the use of multiple, independent root key-pairs 215. For example, multiple users of a client device 106 could each have his or her root key-pair 215 that is accessible only to a respective user. As another example, multiple client applications executing on the client device 106 could have their own root key-pairs 215 for encrypting and decrypting application-specific data stored on the client device 106. Specifically, the entity associated with the entity service 115 and the client application 203 may have its own root key-pair 215. Further, the entity may define its own authorization policies for access to this root key-pair 215. In this way, the entity can maintain exclusive control to the key hierarchy of the root key-pair 215.

The cryptographic coprocessor 206 may also include a plurality of predefined cryptographic algorithms 218. The predefined cryptographic algorithms 218 can be executed by the cryptographic coprocessor 206 to encrypt, decrypt, or verify data using particular ones of the root key-pairs 215. The set of predefined cryptographic algorithms 218 may be defined by a standard, by the manufacturer of the cryptographic coprocessor 206 or client device 106, or by a developer of the client device 106. As such, the set of predefined cryptographic algorithms 218 may be hardcoded within the hardware, firmware, or software that implements the cryptographic coprocessor 206 and not be configurable by the client application 203. A flag may be sent to the cryptographic coprocessor 206 indicating which of the predefined cryptographic algorithms 218 are to be selected for a cryptographic operation. It is noted that the predefined cryptographic algorithms 218 may exclude the cryptographic algorithm 121 (FIG. 1) in the encrypted code 118. However, the encrypted code 118 may be encrypted using one of the predefined cryptographic algorithms 218.

The approved entities 221 may correspond to a list of entities that are approved for executing code within the cryptographic coprocessor 206, such as the cryptographic algorithm 121. The approved entities 221 may be permitted to store a root key-pair 215 in the cryptographic coprocessor 206. In some embodiments, a list of approved entities 221 may be absent, but the approved entities 221 will have a corresponding root key-pair 215 which enables them to have access to execute an arbitrary cryptographic algorithm 121 in the cryptographic coprocessor 206.

Also, various data can be stored in a client data store 209 that is accessible to the client device 106. The client data store 209 can be representative of a plurality of client data stores 209, which can include relational databases, object-oriented databases, hierarchical databases, hash tables or similar key-value data stores, as well as other data storage applications or data structures. The data stored in the client data store 209 is associated with the operation of the various applications executed by the client device 106. This data can include one or more application key-pairs 224, an encrypted authentication token 163, an identity key-pair 233, and potentially other data.

The application key-pairs 224 are asymmetric encryption key-pairs that can be generated by or imported into the cryptographic coprocessor 206 and used for various data encryption functions. Each application key-pair 224 can be a child, grandchild, or descendant key of a respective root key-pair 215. Moreover, each root key-pair 215 can have one or more application key-pairs 224 associated with it. For example, a user might create multiple application key-pairs 224 for various uses, and these application key-pairs 224 could be stored as subkeys or child keys of the root key-pair 215 for the user. Similarly, a client application 203 that has provisioned its own root key-pair 215 could use multiple application key-pairs 224 for various purposes, and one or more of these application key-pairs 224 could be stored as subkeys of the root key-pair 215 provisioned for the client application 203. Each application key-pair 224 can include an application public key 227 and an encrypted private key 230.

The identity key-pair 233 represents a locally stored asymmetric encryption key-pair that can be generated and used by the cryptographic coprocessor 206 to verify its identity. For example, a message signed with the private key of the identity key-pair 233 could be verified with the identity public key as originating from a specific client device 106 because of the unique identity of the cryptographic coprocessor 206 installed on the client device 106. Accordingly, the identity key-pair 233 may be used as an alias for the endorsement key-pair 212. To prove that the identity key-pair 233 is valid, it may be signed by the cryptographic coprocessor 206 using the private key of endorsement key-pair 212.

The limited-use payment credentials 236 may correspond to limited-use keys. The limited-use payment credentials 236 are dynamic keys generated by a server-side master key. A predefined number of one or more of the limited-use payment credentials 236 may be initially provisioned to the client device 106. The limited-use payment credentials 236 or a session key derived from a limited-use key may be used to verify that a cryptogram 127 was generated by the client device 106. The limited-use payment credentials 236 may be sent to the client device 106, and each respective one of the limited-use payment credentials 236 may be used a single time or a predefined number of times in order to authorize a payment transaction.

Figure 2B:
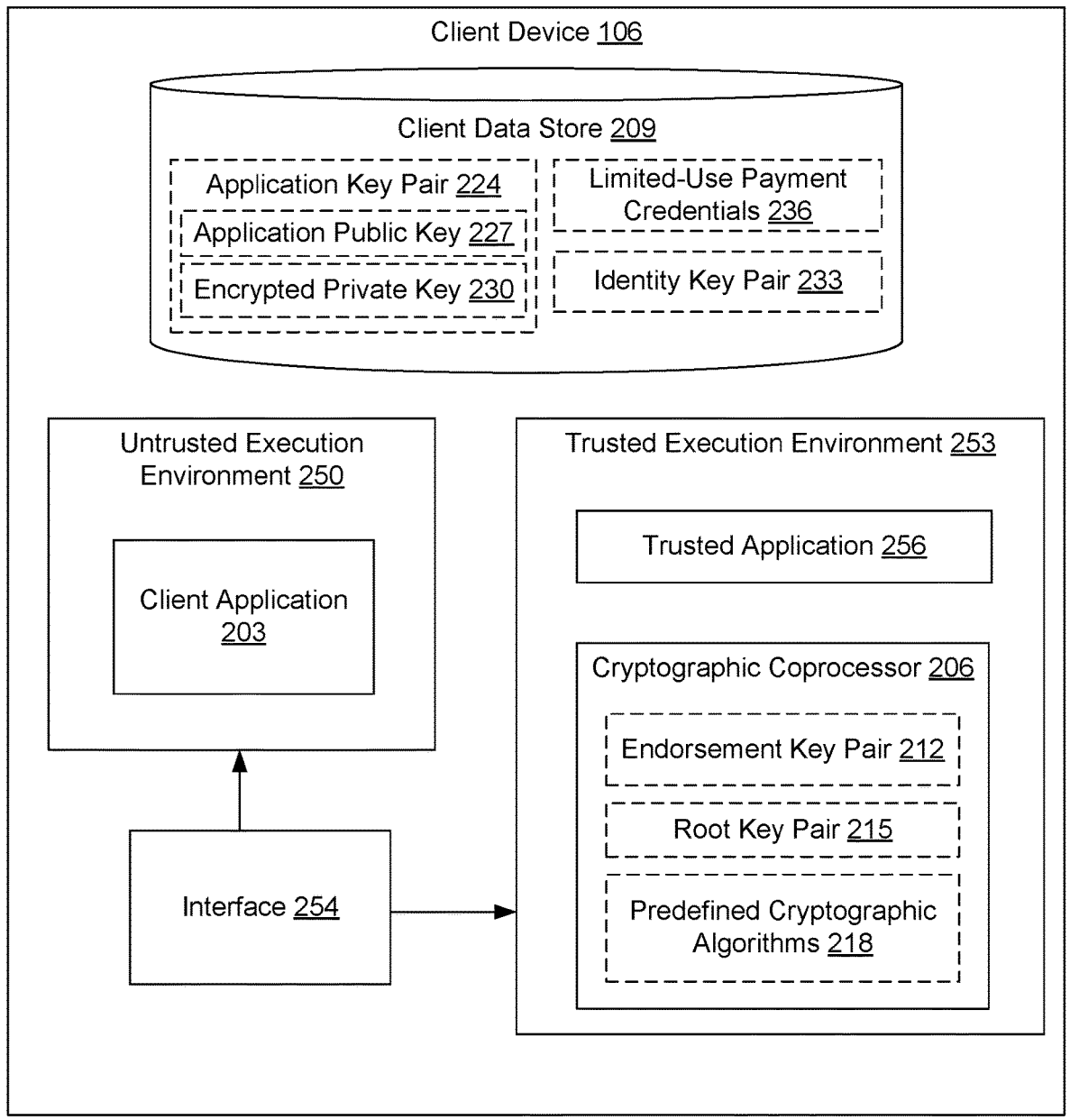
FIG. 2B is a drawing of a client device of the network environment of FIG. 1 according to various embodiments.

Moving on to FIG. 2B, shown is an example of a client device 106 according to various embodiments. The client device 106 can include an untrusted execution environment 250, a trusted execution environment 253, and an interface 254 between the untrusted execution environment 250 and the trusted execution environment 253. The client application 203 can be executed in the untrusted execution environment 250 along with many applications under control of the user. The trusted execution environment 253 is a secure environment with its own secure operating system executed on a secure virtual processor or a secure physical processor. The untrusted execution environment 250 may be executed on a different virtual or physical processor from the secure virtual or physical processor of the trusted execution environment 253.

The hardware processor of the client device 106 may execute a hypervisor or include hardware extensions that mediate or restrict access to the trusted execution environment 253. The interface 254 may be an application programming interface (API) supported by the hypervisor or hardware extensions of the processor to allow for transfer of data between the trusted execution environment 253 and the untrusted execution environment 250 in a secure way. For example, the interface 254 may comprise system calls or messages passed through shared memory.

A trusted application 256 associated with the entity is executed in the trusted execution environment 253. The trusted application 256 may be signed by the entity and verified by the cryptographic coprocessor 206 before being executed in the trusted execution environment 253. The trusted application 256 is executed to receive the encrypted code 118 (FIG. 1) from the client application 203 via the interface 254, verify the authenticity and/or integrity of the encrypted code 118 using the signature 124 (FIG. 1) via the cryptographic coprocessor 206, and decrypt the encrypted code 118 using the cryptographic coprocessor 206.

After the encrypted code 118 has been verified and decrypted, the trusted application 256 then is able to use the cryptographic algorithm 121 (FIG. 1) to encrypt, decrypt, sign, or perform other cryptographic operations. In particular, the trusted application 256 may generate a cryptogram 127 by executing the cryptographic algorithm 121 to encrypt various information. For example, the information may relate to a payment transaction and may include a limited-use payment credential 236 or a limited-use key.

Although FIG. 2B shows a single client data store 209, it is understood that the client data store 209 may be split into multiple data stores, where one or more of the data stores are accessible only through the trusted execution environment 253.

Figure 3:
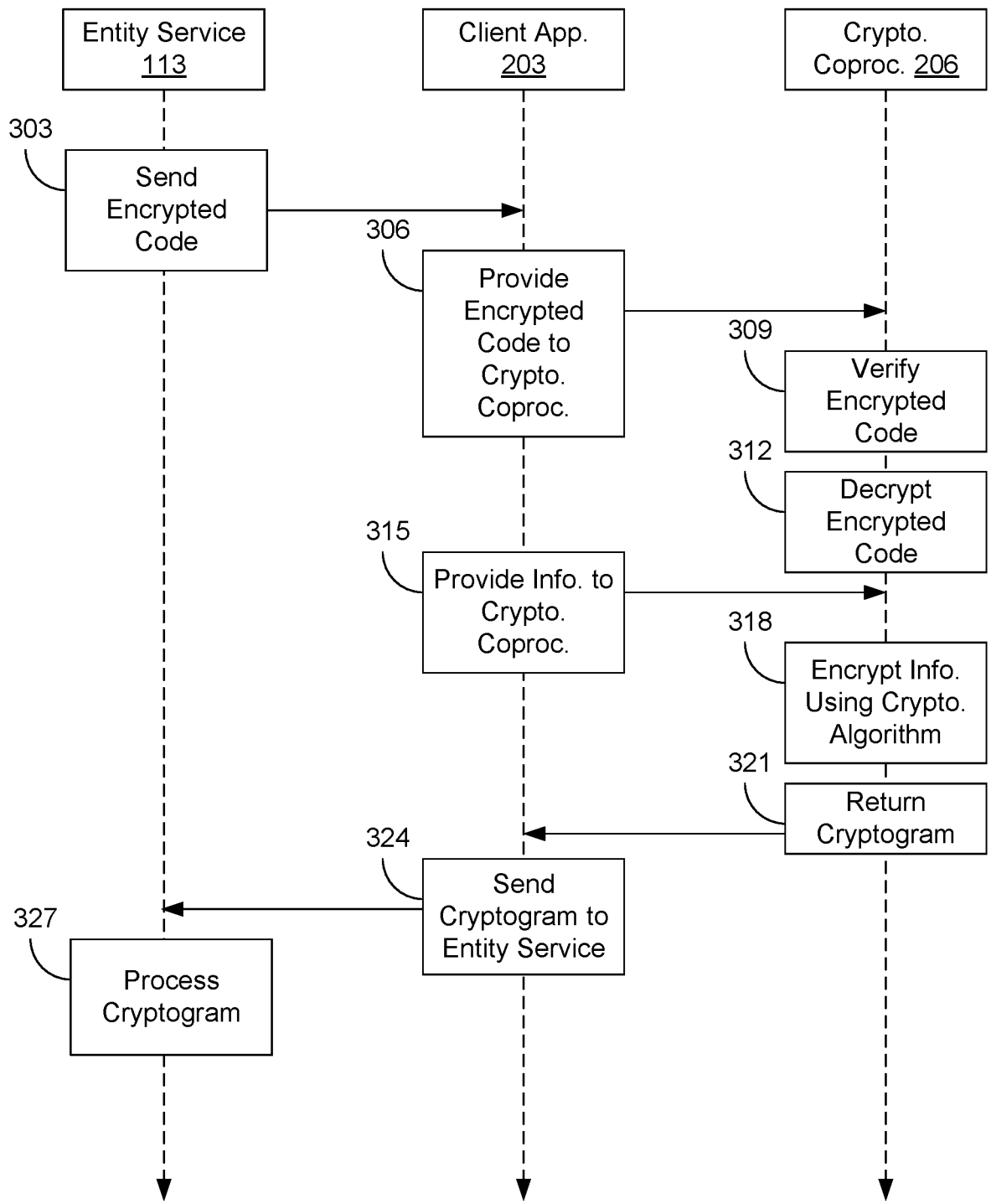
FIG. 3 is a sequence diagram illustrating one example of functionality implemented in the network environment of FIG. 1 with the client device of FIG. 2A according to various embodiments of the present disclosure.

Referring next to FIG. 3, shown is a sequence diagram that provides an example of the interactions between various components of the network environment 100 including the client device 106 of FIG. 2A. The sequence diagram of FIG. 3 provides merely an example of the many different types of functional arrangements that can be employed in the network environment 100. As an alternative, the sequence diagram of FIG. 3 can be viewed as depicting an example of elements of a method implemented within the network environment 100.

Beginning with box 303, the entity service 113 sends the encrypted code 118 (FIG. 1) to the client application 203 executed on the client device 106 (FIG. 2A). The encrypted code 118 may be sent along with a signature 124 (FIG. 1). The header of the signature 124 can be used to identify a particular root key-pair 215 (FIG. 2A) for decrypting the encrypted code 118. Alternatively, the entity service 113 may send a different type of key identifier. In one embodiment, the client device 106 may have a lookup table or mapping stored locally (e.g., in non-volatile random-access memory) that links the entity service 113 to a specific root key-pair 215 for verifying the signature 124 and decrypting the encrypted code 118.

Next, in box 306, the client application 203 provides the encrypted code 118 to the cryptographic coprocessor 206 of the client device 106. For example, the client application 203 may store the encrypted code 118 in the client data store 209 or in other memory, and send a command to the cryptographic coprocessor 206 to load the encrypted code 118 and verify and decrypt it. Where the cryptographic coprocessor 206 is implemented in firmware, data (e.g., root keys) stored in a secure element (e.g., secure data storage) may be transferred from the secure element to the firmware cryptographic coprocessor 206 via an interface that mediates access to the secure element. The data (e.g., root keys) can enable the firmware cryptographic coprocessor 206 to perform functions such as verification and decryption.

In box 309, the cryptographic coprocessor 206 verifies the encrypted code 118 using the signature 124 sent with the encrypted code 118. To this end, the cryptographic coprocessor 206 may obtain a root key-pair 215 associated with the entity in order to perform the verification using the signature 124. The verification procedure thus verifies the authenticity and integrity of the encrypted code 118. In some cases, the cryptographic coprocessor 206 may verify a state of the client device 106 and allow or disallow decryption of the encrypted code 118 based on the state of the client device 106. For example, the cryptographic coprocessor 206 may disallow decryption of the encrypted code 118 if the client device 106 is rooted. If the verification is not successful, decryption and execution of the cryptographic algorithm 121 will not proceed.

In box 312, the cryptographic coprocessor 206 decrypts the encrypted code 118. For example, the cryptographic coprocessor 206 may utilize a particular one of the predefined cryptographic algorithms 218 (FIG. 2A) along with the root key-pair 215 associated with the entity in order to perform the decryption. In decrypting the encrypted code 118, the cryptographic coprocessor 206 obtains the cryptographic algorithm 121 (FIG. 1) in an unencrypted form. In some examples, the cryptographic algorithm 121 may be different from the predefined cryptographic algorithms 218. In other examples, the cryptographic algorithm 121 may be one of the predefined cryptographic algorithms 218, although the identity of the cryptographic algorithm 121 may not be apparent from the encrypted code 118 itself. In one example, the cryptographic coprocessor 206 acts as a root of trust to validate a certain proprietary cryptographic algorithm 121 before handing it to a secure element.

In box 315, the client application 203 provides information to the cryptographic coprocessor 206 for subsequent encryption by the cryptographic coprocessor 206. For example, the information may relate to a particular payment transaction and may include data such as a limited-use payment credential 236 (FIG. 2A) or a limited-use key, an unpredictable number, a sequence number, a monotonic counter value, a timestamp, a transaction amount, and/or other information. In other examples, the client application 203 may provide the information to the cryptographic coprocessor 206 along with the encrypted code 118 or before the encrypted code 118 is provided to the cryptographic coprocessor 206. One or more items of this information (e.g., the unpredictable number) may be generated by the cryptographic coprocessor 206 itself in some examples.

In box 318, the cryptographic coprocessor 206 encrypts the information using the cryptographic algorithm 121 decrypted at box 312 from the encrypted code 118. To this end, the cryptographic coprocessor 206 executes the code that implements the cryptographic algorithm 121 supplied by the entity service 113 and may use a key from the root key-pair 215 associated with the entity or a symmetric key. In this way, the cryptographic coprocessor 206 generates a cryptogram 127 (FIG. 1). In box 321, the cryptographic coprocessor 206 returns the cryptogram 127 to the client application 203.

In box 324, the client application 203 sends the cryptogram 127 to the entity service 113 via the network 109. In box 327, the entity service 113 processes the cryptogram 127. For example, the entity service 113 may validate a signature of the cryptogram 127. The entity service 113 then decrypts the cryptogram 127 using a symmetric key used to encrypt the cryptogram 127, or a private key of the key-pair used to encrypt the cryptogram 127. The entity service 113 may then verify the contents of the cryptogram 127. For example, the entity service 113 may verify that a limited-use payment credential 236 or a limited-use key is valid. Upon verification of the contents, the entity service 113 may then authorize and/or process a corresponding payment transaction.

Figure 4:
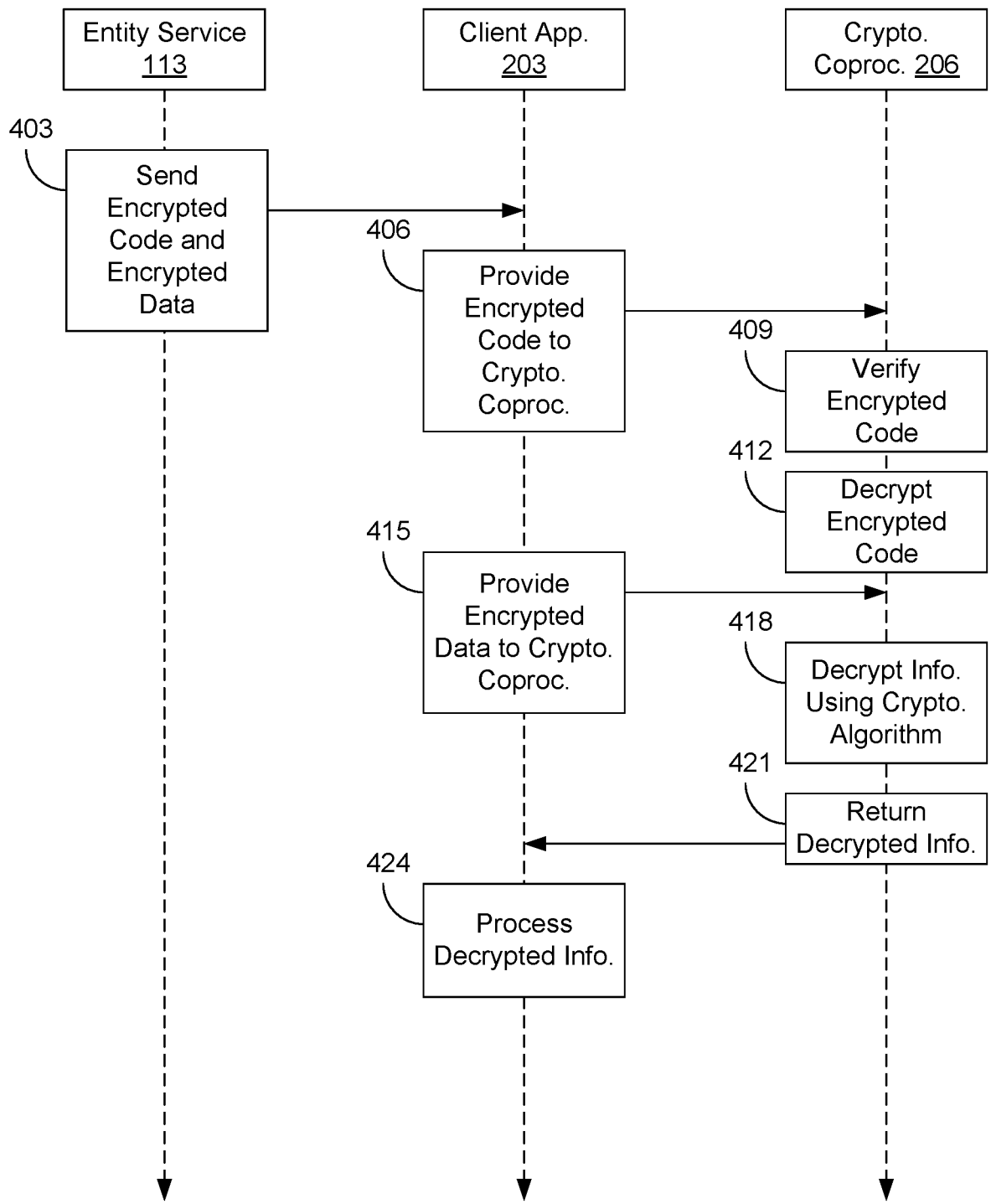
FIG. 4 is a sequence diagram illustrating one example of functionality implemented in the network environment of FIG. 1 with the client device of FIG. 2A according to various embodiments of the present disclosure.

Moving on to FIG. 4, shown is a sequence diagram that provides another example of the interactions between various components of the network environment 100 including the client device 106 of FIG. 2A. The sequence diagram of FIG. 4 provides merely an example of the many different types of functional arrangements that can be employed in the network environment 100. As an alternative, the sequence diagram of FIG. 4 can be viewed as depicting an example of elements of a method implemented within the network environment 100.

Beginning with box 403, the entity service 113 sends the encrypted code 118 (FIG. 1) to the client application 203 executed on the client device 106 (FIG. 2A). The entity service 113 may also send encrypted data along with, before, or after the encrypted code 118, where the encrypted data is encrypted using a cryptographic algorithm 121 (FIG. 1) encrypted within the encrypted code 118. The encrypted code 118 and encrypted data may be sent along with a signature 124 (FIG. 1). The header of the signature 124 can be used to identify a particular root key-pair 215 (FIG. 2A) for decrypting the encrypted code 118 and the encrypted data. Alternatively, the entity service 113 may send a different type of key identifier. In one embodiment, the client device 106 may have a lookup table or mapping stored locally (e.g., in non-volatile random-access memory) that links the entity service 113 to a specific root key-pair 215 for verifying the signature 124 and decrypting the encrypted code 118 and encrypted data.

Next, in box 406, the client application 203 provides the encrypted code 118 to the cryptographic coprocessor 206 of the client device 106. For example, the client application 203 may store the encrypted code 118 in the client data store 209 or in other memory, and send a command to the cryptographic coprocessor 206 to load the encrypted code 118 and verify and decrypt it. Where the cryptographic coprocessor 206 is implemented in firmware, data (e.g., root keys) stored in a secure element (e.g., secure data storage) may be transferred from the secure element to the firmware cryptographic coprocessor 206 via an interface that mediates access to the secure element. The data (e.g., root keys) can enable the firmware cryptographic coprocessor 206 to perform functions such as verification and decryption.

In box 409, the cryptographic coprocessor 206 verifies the encrypted code 118 using the signature 124 sent with the encrypted code 118. To this end, the cryptographic coprocessor 206 may obtain a root key-pair 215 (FIG. 2A) associated with the entity in order to perform the verification using the signature 124. The verification procedure thus verifies the authenticity and integrity of the encrypted code 118. In some cases, the cryptographic coprocessor 206 may verify a state of the client device 106 and allow or disallow decryption of the encrypted code 118 based on the state of the client device 106. For example, the cryptographic coprocessor 206 may disallow decryption of the encrypted code 118 if the client device 106 is rooted. If the verification is not successful, decryption and execution of the cryptographic algorithm 121 will not proceed.

In box 412, the cryptographic coprocessor 206 decrypts the encrypted code 118. For example, the cryptographic coprocessor 206 may utilize a particular one of the predefined cryptographic algorithms 218 (FIG. 2A) along with the root key-pair 215 associated with the entity in order to perform the decryption. In decrypting the encrypted code 118, the cryptographic coprocessor 206 obtains the cryptographic algorithm 121 in an unencrypted form. In some examples, the cryptographic algorithm 121 may be different from the predefined cryptographic algorithms 218. In other examples, the cryptographic algorithm 121 may be one of the predefined cryptographic algorithms 218, although the identity of the cryptographic algorithm 121 may not be apparent from the encrypted code 118 itself. In one example, the cryptographic coprocessor 206 acts as a root of trust to validate a certain proprietary cryptographic algorithm 121 before handing it to a secure element.

In box 415, the client application 203 provides the encrypted data to the cryptographic coprocessor 206. The encrypted data may be any arbitrary data. The encrypted data may include one or more limited-use payment credentials 236 (FIG. 2A) or a limited-use key, or other information related to payment transactions. For example, the client application 203 may store the encrypted data in the client data store 209 or in other memory, and send a command to the cryptographic coprocessor 206 to load the encrypted data and verify and decrypt it.

In box 418, the cryptographic coprocessor 206 decrypts the information in the encrypted data using the cryptographic algorithm 121. To this end, the cryptographic coprocessor 206 executes the entity-supplied code that implements the cryptographic algorithm 121 and may use a key from the root key-pair 215 associated with the entity. In box 421, the cryptographic coprocessor 206 returns the decrypted information to the client application 203. In box 424, the client application 203 may process the decrypted data, which may include re-encrypting the data, storing the data in the client data store 209, and/or performing other actions.

Figure 5:
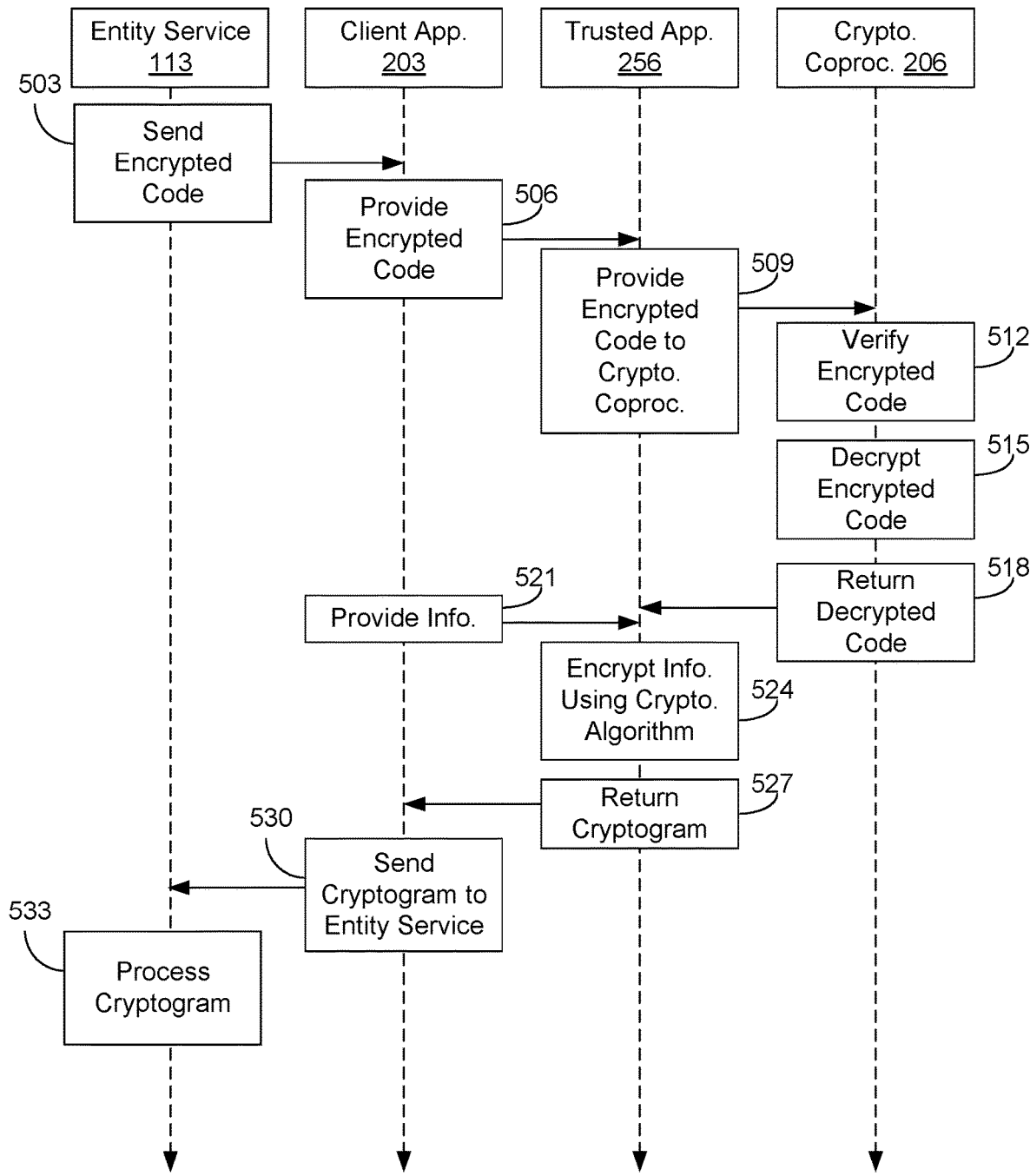
FIG. 5 is a sequence diagram illustrating one example of functionality implemented in the network environment of FIG. 1 with the client device of FIG. 2B according to various embodiments of the present disclosure.

Continuing to FIG. 5, shown is a sequence diagram that provides an example of the interactions between various components of the network environment 100 including the client device 106 of FIG. 2B. The sequence diagram of FIG. 5 provides merely an example of the many different types of functional arrangements that can be employed in the network environment 100. As an alternative, the sequence diagram of FIG. 5 can be viewed as depicting an example of elements of a method implemented within the network environment 100.

Beginning with box 503, the entity service 113 sends the encrypted code 118 (FIG. 1) to the client application 203 executed on the client device 106 (FIG. 2B) in the untrusted execution environment 250 (FIG. 2B). The encrypted code 118 may be sent along with a signature 124 (FIG. 1). The header of the signature 124 can be used to identify a particular root key-pair 215 (FIG. 2B) for decrypting the encrypted code 118. Alternatively, the entity service 113 may send a different type of key identifier. In one embodiment, the client device 106 may have a lookup table or mapping stored locally (e.g., in non-volatile random-access memory) that links the entity service 113 to a specific root key-pair 215 for verifying the signature 124 and decrypting the encrypted code 118.

Next, in box 506, the client application 203 provides the encrypted code 118 to the trusted application 256 executed in the trusted execution environment 253 via the interface 254 (FIG. 2B). For example, the client application 203 may store the encrypted code 118 in the client data store 209 or in other memory, and send a command to the cryptographic coprocessor 206 to load the encrypted code 118 and verify and decrypt it.

In box 509, the trusted application 256 provides the encrypted code 118 to the cryptographic coprocessor 206 of the client device 106. For example, the trusted application 256 may store the encrypted code 118 in a secure portion of the client data store 209 or in other secure memory, and send a command to the cryptographic coprocessor 206 to load the encrypted code 118 and verify and decrypt it. The encrypted code 256 may be provided to the cryptographic coprocessor 206 via an interface between the trusted execution environment 253 and the cryptographic coprocessor 206.

In box 512, the cryptographic coprocessor 206 verifies the encrypted code 118 using the signature 124 (FIG. 1) sent with the encrypted code 118. To this end, the cryptographic coprocessor 206 may obtain a root key-pair 215 (FIG. 2B) associated with the entity in order to perform the verification using the signature 124. The verification procedure thus verifies the authenticity and integrity of the encrypted code 118. In some cases, the cryptographic coprocessor 206 may verify a state of the client device 106 and allow or disallow decryption of the encrypted code 118 based on the state of the client device 106. For example, the cryptographic coprocessor 206 may disallow decryption of the encrypted code 118 if the client device 106 is rooted. If the verification is not successful, decryption and execution of the cryptographic algorithm 121 will not proceed.

In box 515, the cryptographic coprocessor 206 decrypts the encrypted code 118. For example, the cryptographic coprocessor 206 may utilize a particular one of the predefined cryptographic algorithms 218 (FIG. 2B) along with the root key-pair 215 associated with the entity in order to perform the decryption. In decrypting the encrypted code 118, the cryptographic coprocessor 206 produces the cryptographic algorithm 121 (FIG. 1) in an unencrypted form. In some examples, the cryptographic algorithm 121 may be different from the predefined cryptographic algorithms 218. In other examples, the cryptographic algorithm 121 may be one of the predefined cryptographic algorithms 218, although the identity of the cryptographic algorithm 121 may not be apparent from the encrypted code 118 itself. In box 518, the cryptographic coprocessor 206 returns the decrypted code for the cryptographic algorithm 121 to the trusted application 256 via the interface between the cryptographic coprocessor 206 and the trusted execution environment 253. In one example, the cryptographic coprocessor 206 acts as a root of trust to validate a certain proprietary cryptographic algorithm 121 before handing it to the trusted execution environment 253.

In box 521, the client application 203 provides information to the trusted application 256 for subsequent encryption by the trusted application 256. For example, the information may relate to a particular payment transaction and may include data such as a limited-use payment credential 236 (FIG. 2A) or a limited-use key, an unpredictable number, a sequence number, a monotonic counter value, a timestamp, a transaction amount, and/or other information. In other examples, the client application 203 may provide the information to the trusted application 256 along with the encrypted code 118 or before the encrypted code 118 is provided to the trusted application 256. One or more items of this information (e.g., the unpredictable number) may be generated by the cryptographic coprocessor 206 or the trusted application 256 in some examples.

In box 524, the trusted application 256 encrypts the information using the cryptographic algorithm 121. To this end, the trusted application 256 executes the entity-supplied code that implements the cryptographic algorithm 121 and may use a key from the application key pair 224 associated with the entity or a symmetric key. In this way, the trusted application 256 generates a cryptogram 127 (FIG. 1). In box 527, the trusted application 256 returns the cryptogram 127 to the client application 203 via the interface 254.

In box 530, the client application 203 sends the cryptogram 127 to the entity service 113 via the network 109. In box 533, the entity service 113 processes the cryptogram 127. For example, the entity service 113 may validate a signature of the cryptogram 127. The entity service 113 then decrypts the cryptogram 127 using a symmetric key used to encrypt the cryptogram 127, or a private key of the key-pair used to encrypt the cryptogram 127. The entity service 113 may then verify the contents of the cryptogram 127. For example, the entity service 113 may verify that a limited-use payment credential 236 or a limited-use key is valid. Upon verification of the contents, the entity service 113 may then authorize and/or process a corresponding payment transaction.

Figure 6:
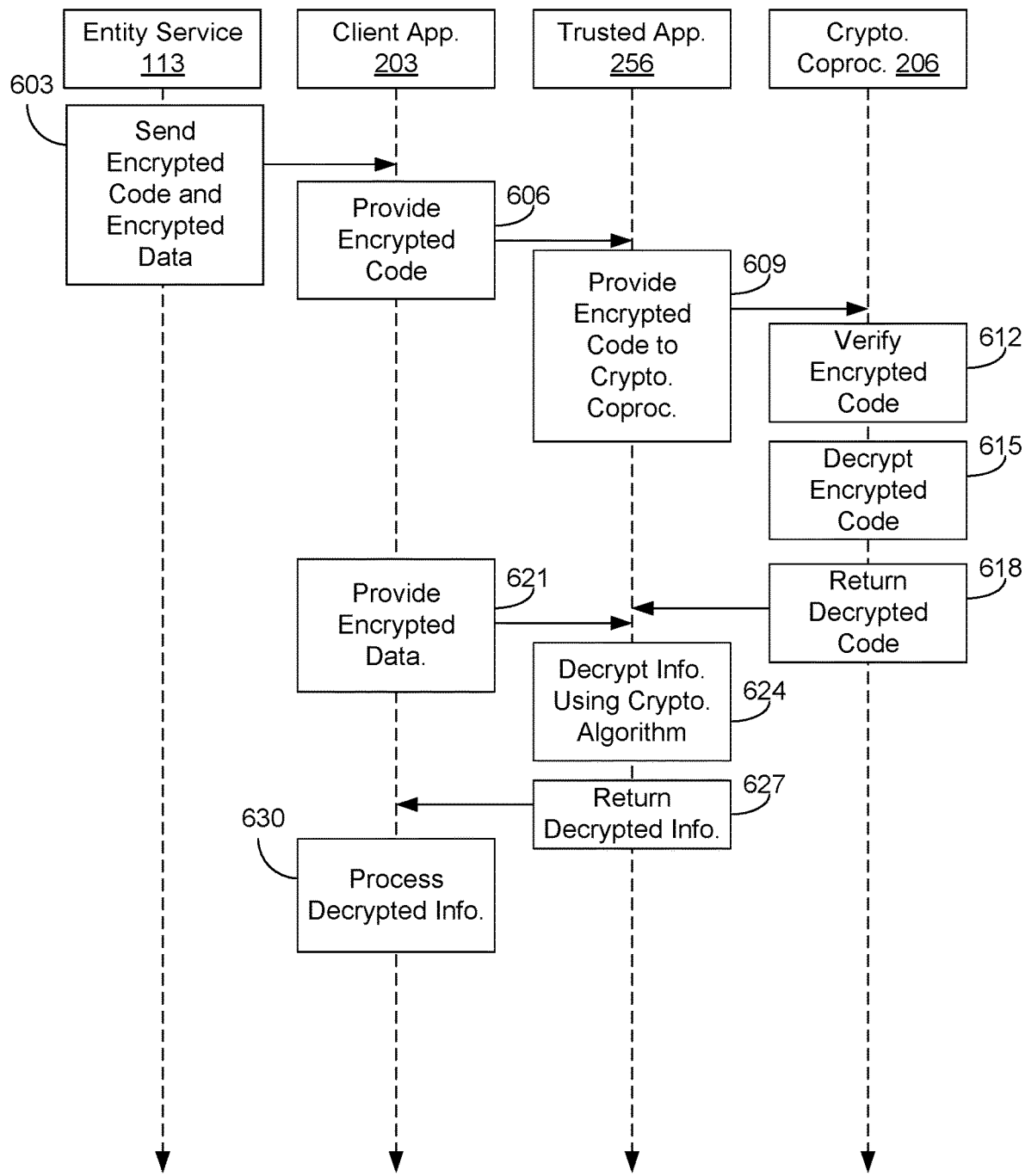
FIG. 6 is a sequence diagram illustrating one example of functionality implemented in the network environment of FIG. 1 with the client device of FIG. 2B according to various embodiments of the present disclosure.

Turning now to FIG. 6, shown is a sequence diagram that provides another example of the interactions between various components of the network environment 100 including the client device 106 of FIG. 2B. The sequence diagram of FIG. 6 provides merely an example of the many different types of functional arrangements that can be employed in the network environment 100. As an alternative, the sequence diagram of FIG. 6 can be viewed as depicting an example of elements of a method implemented within the network environment 100.

Beginning with box 603, the entity service 113 sends the encrypted code 118 (FIG. 1) to the client application 203 executed on the client device 106 (FIG. 2B) in the untrusted execution environment 250 (FIG. 2B). The entity service 113 may also send encrypted data along with, before, or after the encrypted code 118, where the encrypted data is encrypted using a cryptographic algorithm 121 (FIG. 1) encrypted within the encrypted code 118. The encrypted code 118 and encrypted data may be sent along with a signature 124 (FIG. 1). The header of the signature 124 can be used to identify a particular root key-pair 215 (FIG. 2B) for decrypting the encrypted code 118. Alternatively, the entity service 113 may send a different type of key identifier. In one embodiment, the client device 106 may have a lookup table or mapping stored locally (e.g., in non-volatile random-access memory) that links the entity service 113 to a specific root key-pair 215 for verifying the signature 124 and decrypting the encrypted code 118 and the encrypted data.

Next, in box 606, the client application 203 provides the encrypted code 118 to the trusted application 256 executed in the trusted execution environment 253 (FIG. 2B) via the interface 254 (FIG. 2B).

In box 609, the trusted application 256 provides the encrypted code 118 to the cryptographic coprocessor 206 of the client device 106. For example, the trusted application 256 may store the encrypted code 118 in a secure portion of the client data store 209 or in other secure memory, and send a command to the cryptographic coprocessor 206 to load the encrypted code 118 and verify and decrypt it. The encrypted code 256 may be provided to the cryptographic coprocessor 206 via an interface between the trusted execution environment 253 and the cryptographic coprocessor 206. In box 612, the cryptographic coprocessor 206 verifies the encrypted code 118 using the signature 124 sent with the encrypted code 118. To this end, the cryptographic coprocessor 206 may obtain a root key-pair 215 associated with the entity in order to perform the verification using the signature 124. The verification procedure thus verifies the authenticity and integrity of the encrypted code 118. In some cases, the cryptographic coprocessor 206 may verify a state of the client device 106 and allow or disallow decryption of the encrypted code 118 based on the state of the client device 106. For example, the cryptographic coprocessor 206 may disallow decryption of the encrypted code 118 if the client device 106 is rooted. If the verification is not successful, decryption and execution of the cryptographic algorithm 121 will not proceed.

In box 615, the cryptographic coprocessor 206 decrypts the encrypted code 118. For example, the cryptographic coprocessor 206 may utilize a particular one of the predefined cryptographic algorithms 218 (FIG. 2B) along with the root key-pair 215 associated with the entity in order to perform the decryption. In decrypting the encrypted code 118, the cryptographic coprocessor 206 produces the cryptographic algorithm 121 in an unencrypted form. In some examples, the cryptographic algorithm 121 may be different from the predefined cryptographic algorithms 218. In other examples, the cryptographic algorithm 121 may be one of the predefined cryptographic algorithms 218, although the identity of the cryptographic algorithm 121 may not be apparent from the encrypted code 118 itself. In one example, the cryptographic coprocessor 206 acts as a root of trust to validate a certain proprietary cryptographic algorithm 121 before handing it to the trusted execution environment 253.

In box 618, the cryptographic coprocessor 206 returns the decrypted code for the cryptographic algorithm 121 to the trusted application 256 via the interface between the trusted execution environment 253 and the cryptographic coprocessor 206. In other examples, upon verification of the encrypted code 118 by the cryptographic coprocessor 206, the trusted application 256 may then decrypt the encrypted code 118.

In box 621, the client application 203 provides the encrypted data to the trusted application 256 via the interface 254. The encrypted data may be any arbitrary data. The encrypted data may include one or more limited-use payment credentials 236 (FIG. 2A) or a limited-use key, or other information related to payment transactions.

In box 624, the trusted application 256 decrypts the information in the encrypted data using the cryptographic algorithm 121. To this end, the trusted application 256 executes the entity-supplied code that implements the cryptographic algorithm 121 and may use a key from the application key pair 224 (FIG. 2B) associated with the entity. In box 627, the trusted application 256 returns the decrypted information to the client application 203 via the interface 254. In box 630, the client application 203 may process the decrypted data, which may include re-encrypting the data, storing the data in the client data store 209, and/or performing other actions.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, non-volatile random access memory (NVRAM), or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

Examples of embodiments of the present disclosure may be described as follows:

Embodiment 1. A system, comprising: a computing device comprising a processor, a memory, and a cryptographic coprocessor; and machine-readable instructions stored in the memory that, when executed by the processor, cause the computing device to at least: receive encrypted code implementing a cryptographic algorithm from a service via a network; decrypt, by the cryptographic coprocessor, the encrypted code; execute, by the cryptographic coprocessor, the decrypted code to generate a cryptogram including information encrypted using the cryptographic algorithm; and send the cryptogram to the service via the network.

Embodiment 2. The system of embodiment 1, wherein the cryptographic coprocessor complies with a version of a Trusted Platform Module (TPM) standard.

Embodiment 3. The system of embodiment 1, wherein the cryptographic coprocessor is configured to verify a state of the computing device before decrypting the encrypted code.

Embodiment 4. The system of embodiment 1, wherein the service is operated by an entity, and the cryptographic algorithm is a preferred cryptographic algorithm of the entity.

Embodiment 5. The system of embodiment 1, wherein the cryptographic coprocessor is configured to verify that the encrypted code is signed by an entity from a predefined plurality of trusted entities before executing the decrypted code.

Embodiment 6. The system of embodiment 1, wherein the encrypted code is decrypted using a root key of the cryptographic coprocessor that is associated with an entity that generated the encrypted code.

Embodiment 7. The system of embodiment 1, wherein the service comprises a first service and a second service which are associated with an entity, the encrypted code is received from the first service, and the cryptogram is sent to the second service.

Embodiment 8. The system of embodiment 1, wherein the cryptographic coprocessor is implemented in firmware in the computing device, and data is transferred from a secure element of the computing device to the cryptographic coprocessor via an interface to enable decryption of the encrypted code by the cryptographic coprocessor.

Embodiment 9. The system of embodiment 1, wherein the cryptographic coprocessor is configured to support a selection from a predefined plurality of cryptographic algorithms to perform a cryptographic operation, and the cryptographic algorithm is excluded from the predefined plurality of cryptographic algorithms.

Embodiment 10. The system of embodiment 1, wherein the cryptographic coprocessor is configured to act as a root of trust to verify the cryptographic algorithm before transferring the cryptographic algorithm to a secure element of the computing device.

Embodiment 11. A method, comprising: receiving, by a cryptographic coprocessor, encrypted code implementing a cryptographic algorithm from a client application; decrypting, by the cryptographic coprocessor, the encrypted code; and executing, by the cryptographic coprocessor, the decrypted code to decrypt encrypted data using the cryptographic algorithm; or executing, by the cryptographic coprocessor, the decrypted code to generate a cryptogram using the cryptographic algorithm.

Embodiment 12. The method of embodiment 11, further comprising verifying, by the cryptographic coprocessor, that the encrypted code is signed by an entity from a predefined plurality of trusted entities before executing the decrypted code.

Embodiment 13. The method of embodiment 11, wherein the encrypted code is received by the client application from a service operated by an entity, and the client application is associated with the entity.

Embodiment 14. The method of embodiment 13, wherein decrypting the encrypted code further comprises decrypting the encrypted code using a root key of the cryptographic coprocessor that is associated with the entity.

Embodiment 15. The method of embodiment 13, wherein the encrypted data and the encrypted code exclude an identifier of the cryptographic algorithm.

Embodiment 16. The method of embodiment 13, wherein the cryptographic coprocessor is configured to support a selection from a predefined plurality of cryptographic algorithms to perform a cryptographic operation, and the cryptographic algorithm is excluded from the predefined plurality of cryptographic algorithms.

Embodiment 17. A non-transitory, computer-readable medium comprising machine readable instructions that, when executed by a processor of a first computing device, cause the first computing device to at least: encrypt a cryptographic algorithm to create encrypted code; send the encrypted code to a second computing device; receive a cryptogram generated with the cryptographic algorithm from the encrypted code from the second computing device; and decrypt the cryptogram with the cryptographic algorithm.

Embodiment 18. The non-transitory computer-readable medium of embodiment 17, wherein the encrypted code is sent to the second computing device along with an identifier for a cryptographic key to decrypt the encrypted code.

Embodiment 19. The non-transitory computer-readable medium of embodiment 17, wherein the encrypted code excludes an identifier of the cryptographic algorithm.

Embodiment 20. The non-transitory computer-readable medium of embodiment 17, wherein encrypted code is encrypted using one of a predefined plurality of cryptographic algorithms supported by a standard for a cryptographic coprocessor.

Embodiment 21. A system, comprising: a computing device comprising a processor and a memory; and machine-readable instructions stored in the memory that, when executed by the processor, cause the computing device to at least: receive encrypted code implementing a cryptographic algorithm from a service via a network; provide the encrypted code to an application executed in a trusted execution environment of the computing device; obtain a cryptogram including information encrypted using the cryptographic algorithm from the application.

Embodiment 22. The system of embodiment 21, wherein the cryptogram is obtained by another application executed in an untrusted execution environment of the computing device.

Embodiment 23. The system of embodiment 22, wherein the machine-readable instructions further cause the computing device to at least send the cryptogram by the other application to the service via the network.

Embodiment 24. The system of embodiment 21, wherein the encrypted code is provided to the application via an interface between the trusted execution environment of the computing device and an untrusted execution environment of the computing device.

Embodiment 25. The system of embodiment 21, wherein the trusted execution environment includes a cryptographic coprocessor, and the machine-readable instructions further cause the computing device to at least verify, by the cryptographic coprocessor, a signature of the encrypted code and a state of the computing device before decrypting the encrypted code.

Embodiment 26. The system of embodiment 21, wherein the trusted execution environment includes a cryptographic coprocessor, and the machine-readable instructions further cause the computing device to at least verify, by the cryptographic coprocessor, a signature of the application.

Embodiment 27. The system of embodiment 21, wherein the trusted execution environment includes a cryptographic coprocessor, and the cryptographic algorithm is not included in a predefined plurality of cryptographic algorithms supported by the cryptographic coprocessor.

Embodiment 28. The system of embodiment 21, wherein the trusted execution environment comprises a secure operating system executed on a secure virtual processor of the processor.

Embodiment 29. The system of embodiment 21, wherein the cryptogram corresponds to a payment transaction, and the cryptogram includes a limited use payment credential.

Embodiment 30. The system of embodiment 21, wherein the trusted execution environment stores a key used to decrypt the encrypted code, the key being associated with an entity that operates the service.

Embodiment 31. A method, comprising: receiving, by a first application executed in an untrusted execution environment, encrypted data and encrypted code implementing a cryptographic algorithm via a network; transferring, by the first application, the encrypted data and the encrypted code to a second application executed in a trusted execution environment; decrypting, by the second application, the encrypted code; executing, by the second application, the decrypted code to decrypt the encrypted data using the cryptographic algorithm; and receiving, by the first application, information decrypted from the encrypted data from the second application.

Embodiment 32. The method of embodiment 31, further comprising: transferring the encrypted code from the second application to a cryptographic coprocessor using an interface; and verifying a signature of the encrypted code using the cryptographic coprocessor.

Embodiment 33. The method of embodiment 32, wherein executing the decrypted code is not performed by the cryptographic coprocessor.

Embodiment 34. The method of embodiment 32, wherein decrypting the encrypted code is performed by the cryptographic coprocessor.

Embodiment 35. The method of embodiment 32, wherein the cryptographic coprocessor includes code that implements a predefined plurality of cryptographic algorithms, and the cryptographic algorithm is executed from the predefined plurality of cryptographic algorithms.

Embodiment 36. The method of embodiment 31, wherein the encrypted code is received from a service operated by an entity, and the first application and the second application are associated with the entity.

Embodiment 37. A non-transitory, computer-readable medium comprising machine readable instructions that, when executed in a trusted execution environment of a processor of a computing device, cause the computing device to at least: receive encrypted code implementing a cryptographic algorithm via an interface to an untrusted execution environment of the processor; decrypt the encrypted code; execute the decrypted code to generate a cryptogram including information encrypted using the cryptographic algorithm; and return the cryptogram via the interface.

Embodiment 38. The non-transitory computer-readable medium of embodiment 37, wherein the computing device further comprises a cryptographic coprocessor, and the machine-readable instructions further cause the computing device to at least: verify a signature of the encrypted code using the cryptographic coprocessor; or verify the cryptographic algorithm as a root of trust before transferring the cryptographic algorithm to the trusted execution environment.

Embodiment 39. The non-transitory computer-readable medium of embodiment 37, wherein the trusted execution environment comprises a secure operating system executed on a secure virtual processor of the processor.

Embodiment 40. The non-transitory computer-readable medium of embodiment 37, wherein the cryptogram corresponds to a payment transaction, and the cryptogram includes a limited use payment credential.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor, a memory, and a cryptographic coprocessor; and
   machine-readable instructions stored in the memory that, when executed by the processor, cause the computing device to at least:
      store a plurality of root keys within the cryptographic coprocessor, wherein at least one or more of the plurality of root keys are associated with a service;
      receive encrypted code that includes implementing a cryptographic algorithm from the service via a network, wherein the encrypted code further includes a symmetric encryption key and a key identifier, wherein the key identifier identifies a particular root key of the one or more of the plurality of root keys that are associated with the service and are stored within the cryptographic coprocessor;
      decrypt, by the cryptographic coprocessor, the encrypted code using the particular root key associated with the service;
      execute, by the cryptographic coprocessor, the decrypted code to generate a cryptogram including information encrypted using the cryptographic algorithm and the symmetric encryption key; and
      send the cryptogram to the service via the network.

2. The system of claim 1, wherein the cryptographic coprocessor complies with a version of a Trusted Platform Module (TPM) standard.

3. The system of claim 1, wherein the cryptographic coprocessor is configured to verify a state of the computing device before decrypting the encrypted code.

4. The system of claim 1, wherein the service is operated by an entity, and the cryptographic algorithm is a preferred cryptographic algorithm of the entity.

5. The system of claim 1, wherein the cryptographic coprocessor is configured to verify that the encrypted code is signed by an entity from a predefined plurality of trusted entities before executing the decrypted code.

6. The system of claim 1, wherein the encrypted code is decrypted using the particular root key of the cryptographic coprocessor that is associated with an entity that generated the encrypted code, wherein the entity provides the service.

7. The system of claim 1, wherein the service comprises a first service and a second service which are associated with an entity, the encrypted code is received from the first service, and the cryptogram is sent to the second service.

8. The system of claim 1, wherein the cryptographic coprocessor is implemented in firmware in the computing device, and data is transferred from a secure element of the computing device to the cryptographic coprocessor via an interface to enable decryption of the encrypted code by the cryptographic coprocessor.

9. The system of claim 1, wherein the cryptographic coprocessor is configured to support a selection from a predefined plurality of cryptographic algorithms to perform a cryptographic operation, and the cryptographic algorithm is excluded from the predefined plurality of cryptographic algorithms.

10. The system of claim 1, wherein the cryptographic coprocessor is configured to act as a root of trust to verify the cryptographic algorithm before transferring the cryptographic algorithm to a secure element of the computing device.

11. A method, comprising:
storing, by a cryptographic coprocessor, a plurality of root keys within the cryptographic coprocessor, wherein at least one or more of the plurality of root keys are associated with a service;
receiving, by a cryptographic coprocessor, encrypted code that includes implementing a cryptographic algorithm from the service via a network, wherein the encrypted code further includes a symmetric encryption key and a key identifier, wherein the key identifier identifies a particular root key of the one or more of the plurality of root keys that are associated with the service and are stored within the cryptographic coprocessor;
decrypting, by the cryptographic coprocessor, the encrypted code using the particular root key associated with the service;
executing, by the cryptographic coprocessor, the decrypted code to generate a cryptogram including information encrypted using the cryptographic algorithm and the symmetric encryption key; and
sending, by the cryptographic coprocessor, the cryptogram to the service via the network.

12. The method of claim 11, further comprising verifying, by the cryptographic coprocessor, that the encrypted code is signed by an entity from a predefined plurality of trusted entities before executing the decrypted code.

13. The method of claim 11, further comprising verifying, by the cryptographic coprocessor of a computing device, a state of the computing device before decrypting the encrypted code.

14. The method of claim 11, wherein the encrypted code is decrypted using the particular root key of the cryptographic coprocessor that is associated with an entity that generated the encrypted code, wherein the entity provides the service.

15. The method of claim 11, wherein the service comprises a first service and a second service which are associated with an entity, the encrypted code is received from the first service, and the cryptogram is sent to the second service.

16. The method of claim 11, wherein the cryptographic coprocessor is implemented in firmware in a computing device, and data is transferred from a secure element of the computing device to the cryptographic coprocessor via an interface to enable decryption of the encrypted code by the cryptographic coprocessor.

17. A non-transitory computer-readable medium comprising machine-readable instructions that, when executed by a first computing device, cause the first computing device to at least:
store a plurality of root keys within a cryptographic coprocessor, wherein at least one or more of the plurality of root keys are associated with a service;
receive encrypted code that includes implementing a cryptographic algorithm from the service via a network, wherein the encrypted code further includes a symmetric encryption key and a key identifier, wherein the key identifier identifies a particular root key of the one or more of the plurality of root keys that are associated with the service and are stored within the cryptographic coprocessor;
decrypt the encrypted code using the particular root key associated with the service;
execute the decrypted code to generate a cryptogram including information encrypted using the cryptographic algorithm and the symmetric encryption key; and
send the cryptogram to the service via the network.

18. The non-transitory computer-readable medium of claim 17, wherein encrypted code is encrypted using one of a predefined plurality of cryptographic algorithms supported by a standard for the cryptographic coprocessor.

19. The non-transitory computer-readable medium of claim 18, wherein the encrypted code is decrypted using the particular root key of the cryptographic coprocessor that is associated with an entity that generated the encrypted code, wherein the entity provides the service.

* * * * *